United States Patent
Apostolopoulos et al.

(10) Patent No.: US 6,952,307 B2
(45) Date of Patent: Oct. 4, 2005

(54) ELECTRIC FIELD POLING OF FERROELECTRIC MATERIALS

(75) Inventors: Vasilis Apostolopoulos, Hampshire (GB); Alessandro Busacca, Palermo (IT); Sakellaris Mailis, Hampshire (GB); Robert Eason, Hampshire (GB)

(73) Assignee: University of Southampton, Hampshire (GB)

( * ) Notice: Subject to any disclaimer, the term of this patent is extended or adjusted under 35 U.S.C. 154(b) by 0 days.

(21) Appl. No.: 10/481,902

(22) PCT Filed: Jun. 26, 2002

(86) PCT No.: PCT/GB02/02956

§ 371 (c)(1),
(2), (4) Date: May 26, 2004

(87) PCT Pub. No.: WO03/003111

PCT Pub. Date: Jan. 9, 2003

(65) Prior Publication Data

US 2004/0207903 A1 Oct. 21, 2004

(30) Foreign Application Priority Data

Jun. 27, 2001 (GB) .............................. 0115657

(51) Int. Cl.$^7$ .............................. G02F 1/00; G02F 1/01; G02F 1/35; H01S 3/10; G02B 6/00
(52) U.S. Cl. ..................... 359/321; 359/279; 359/326; 359/328; 359/332; 359/333; 372/22; 372/102; 385/122
(58) Field of Search .............................. 359/321, 279, 359/278, 254, 255, 249, 320, 326, 328, 332, 333; 372/22, 102; 385/122, 123, 3; 398/87, 188

(56) References Cited

U.S. PATENT DOCUMENTS

| | | | | |
|---|---|---|---|---|
| 6,344,921 | B1 | * | 2/2002 | Galvanauskas et al. ..... 359/332 |
| 6,433,919 | B1 | * | 8/2002 | Chowdhury et al. ........ 359/332 |
| 6,714,569 | B2 | * | 3/2004 | Zhu et al. ..................... 372/22 |
| 6,788,727 | B2 | * | 9/2004 | Liu ............................ 372/102 |
| 6,801,356 | B2 | * | 10/2004 | Broderick et al. .......... 359/332 |
| 6,853,671 | B2 | * | 2/2005 | Liu et al. .................... 372/102 |
| 2002/0171913 | A1 | * | 11/2002 | Batchko et al. ............. 359/333 |

FOREIGN PATENT DOCUMENTS

EP 0 745 883 12/1996

OTHER PUBLICATIONS

Batchko, Robert et al. "Backswitch poling in lithium niobate for high–fidelity domain patterning and efficient blue light generation." *Applied Physics Letters.* 75.12 (1999):1673–1675.

(Continued)

Primary Examiner—Loha Ben
(74) Attorney, Agent, or Firm—Renner, Otto, Boisselle & Sklar, LLP

(57) ABSTRACT

A method of inducing a periodic variation of nonlinearity in a sample of ferroelectric material, comprises applying an electrically insulting mask to surface of the sample, applying an electric field across the sample to produce domain inversion in the sample, and removing the electric field when non-inverted regions of the sample remain only in the vicinity of the surface of the sample beneath parts of the surface covered by the mask. This method can be used to engineer accurate domain periods of submicron dimensions or larger which are confined to a surface region of the ferroelectric material, so that the poled material can be used to fabricate planar waveguide devices for nonlinear optical applications. In particular, the submicron periods can be exploited in the fabrication of one and two-dimensional photonic band gap devices.

25 Claims, 11 Drawing Sheets

OTHER PUBLICATIONS

Sugita, Tomoya et al. "Ultraviolet Light Generation in a Periodically Poled MgO:LiNbO$_3$ Waveguide." *Japanese Journal of Applied Physics, Part 1.* 40.3B (2000):1751–1753.

Kintaka, K. et al. "Efficient ultraviolet light generation by LiNbO$_3$ waveguide first–order quasi–phase matched second–harmonic generation devices." *Electronic Letters.* 32.24 (1996):2237–2239.

Yamada, M. et al. "First–order quasi–phase matched LiNbO$_3$ waveguide periodically poled by applying an exter nal field for efficient blue second–harmonic generation." *Applied Physics Letters.* 62.5 (1993):435–437.

Shur, V. YA. et al. "Regular Ferroelectric Domain Array in Lithium Niobate Crystals for Nonlinear Optic Applications." *Ferroelectrics.* 236 (2000):129–144.

Webjörn, Jonas. "Fabrication of Periodically Domain–Inverted Channel Waveguides in Lithium Niobate for Second Harmonic Generation." *Journal of Lightwave Technology.* 7.10 (1989):1597–1600.

* cited by examiner

US 6,952,307 B2

ELECTRIC FIELD POLING OF FERROELECTRIC MATERIALS

This application is a national phase of International Application No. PCT/GB02/02956 filed Jun. 26, 2002 and published in the English language.

BACKGROUND OF THE INVENTION

The present invention relates to electric field poling of ferroelectric materials, particularly to a method of inducing periodic poling in surface regions of samples of ferroelectric materials, and to optical waveguide devices comprising ferroelectric materials having periodic poling in surface regions.

Domain engineering in ferroelectric materials is becoming an increasingly important topic as the demand grows from the optical telecommunication market for new integrated optical devices. The technique involves engineering of a material so that its nonlinear coefficient (nonlinearity) is periodically reversed to form a grating in a chosen direction. The material can then be used for "quasi-phasematching" of nonlinear optical interactions, which can vastly increase the interaction efficiency over that achievable in non-engineered material. The engineering process is commonly known as "periodic poling", and material which has been treated in this way is described as "periodically poled". Periodically poled lithium niobate and lithium tantalate crystals are now commercially available products for use as efficient frequency converters or as nonlinear media for optical parametric processes.

Numerous techniques exist which have been applied for periodic poling, most of them designed to create periodic 180° domain structures with a specified mark-to-space ratio extending throughout the full depth of the material. A particularly common technique is that of electric field poling, whereby an electric field is applied across a sample of ferroelectric material. This causes inversion of crystal domains in the material, which reverses the polarity and hence the nonlinearity. The periodicity is achieved by applying a metal mask/electrode structure corresponding to the desired pattern of poling to a surface of the sample before applying the electric field. It is necessary to make very accurate calculations of the electric charge flowing during the poling process, as this governs the level of domain inversion achieved, and hence the quality of the resulting poled sample. Too much charge results in sideways growth of the inverted regions, which can affect the mark-to-space ratio achieved. Also, high electric fields are required for bulk domain reversal in ferroelectrics such as lithium niobate and lithium tantalate. Inherent nonuniformities and defects present in commercially available and doped (in the case of waveguide fabrication) materials can restrict the applicability of standard bulk electric field poling techniques of this type to the engineering of large periods of order >15 $\mu$m. For first order nonlinear interactions such as frequency doubling, however, shorter periods are required (of the order of a few micrometres). These are difficult to fabricate routinely and in many cases the material has to be polished down to thickness of order 150 $\mu$m or less [1, 2].

Two approaches aimed at overcoming this apparent limit on domain period have recently been reported. A first approach, referred to as controlled spontaneous backswitching, has been applied to bulk samples of lithium niobate of typical thickness 500 $\mu$m, to create periods of 4 $\mu$m [3], and more recently 2.6 $\mu$m [4]. The applied electric field is rapidly modulated, which exploits a natural tendency of recently-inverted domains at the edge of inverted areas to return to their original orientation (backswitching). Thus, the width of the inverted area reduces, altering the mark-to-space ratio of the poling. Finally, a stabilisation voltage is applied to prevent further backswitching. Uniform short period poling can be engineered in this way, but the complicated variation of the electric field requires complex voltage control and detailed calculations.

A second approach, applied to MgO:LiNbO$_3$ which has the benefit of improved resistance to photorefractive damage, utilises multiple short voltage pulses and has been used to generate a period of 2.2 $\mu$m at a depth of 1.5 $\mu$m [5]. The resulting sample was used in conjunction with a waveguide geometry and produced a high nonlinear optical conversion efficiency. Once again, however, the use of multiple current pulses requires complex control.

A further feature of the standard bulk electric field poling and the controlled spontaneous backswitching techniques is that they aim to produce poling through the whole depth of the sample. However, when the nonlinear optical application involves planar or channel waveguides, the requirement for deep domain inversion is no longer important so long as there is a good overlap between the guided optical fields and the inverted domain regions. Typical depth dimensions in the case of waveguides (and hence required depth of domain inversion) lie in the region of only about 2 $\mu$m to 10 $\mu$m. Hence it is not necessary to rely on poling techniques which aim to achieve uniform high quality domain engineering at depths exceeding this. One technique which is addressed to creating shallow poling is based on Li$_2$O out-diffusion [6]. This can cause superficial domain inversion, but cannot achieve deep enough domains for sufficient overlap with the guided optical fields used in waveguides. Furthermore, it requires high temperature annealing processes.

Thus, it would be of great benefit to provide a simple poling process capable of accurately engineering short domain periods, including submicron periods, which do not need to extend throughout the thickness of a sample, to overcome the complexities and drawbacks of known processes.

SUMMARY OF THE INVENTION

The present invention is based on the surprising result that it is possible to obtain high quality periodic poling by providing what, according to conventional bulk electric field poling techniques, would be regarded as too much charge. Typically, the provision of too much charge to a sample being poled in this way produces undesirable "overpoling", in which the inverted regions grow too large and destroy the desired mark-to-space ratio of the poling. This makes the sample unsuitable for its intended nonlinear optical application, because the efficiency of the phase matching will be reduced. It is generally believed in the art that, in the extreme, overpoling results in the domain inversion of the entire sample so that no grating results.

However, it has been observed that this is not in fact the case. Overpoling has been found not to cause inversion of the whole sample, but to leave small noninverted regions in the surface region of the sample. These regions occur beneath those parts of the sample surface which are protected from the applied electric field by an insulating mask, and correspond well to the pattern defined by the mask, thus giving accurate surface engineering of the sample. The depth of the resulting domains is sufficient for use in planar or channel optical waveguides, in which the guided modes typically propagate in a region extending roughly up to 10

μm below the waveguide surface. Thus, high quality nonlinear waveguide devices can be fabricated much more easily than is possible with bulk poling methods which seek to achieve accurate poling throughout the whole depth of a sample.

Accordingly, a first aspect of the present invention is directed to a method of inducing a periodic variation of nonlinearity value in a sample of ferroelectric material, comprising:

applying an electrically insulating mask to a surface of the sample, the mask defining a desired area of nonlinearity variation;

applying an electric field across the sample to produce domain inversion in the sample beneath the area defined by the mask; and removing the electric field when non-inverted regions of the sample remain only in the vicinity of the surface of the sample beneath parts of the surface covered by the mask.

This is a particularly attractive method of producing periodically poled structures, because it is simple and straightforward. Highly accurate control of the amount of charge provided to the sample during the poling process is not essential, since there is no need to avoid the overpoling which is so detrimental to prior art techniques. Also, the lack of reliance on spontaneous backswitching in the sample allows the electric field to be provided as a single pulse, thus permitting simple electronic control of the poling process.

According to embodiments of the invention, the non-inverted regions extend to a depth below the surface of the sample of less than 50 μm, less than 12 μm, or alternatively to a depth below the surface of the sample of between 2 and 10 μm. These depths of domain engineering are all that are needed for waveguide applications, so that useful devices can be simply manufactured without the need to control the electric field application to the high degree that is necessary to prevent overpoling in prior art methods.

In a preferred embodiment, the method further comprises, before the applying of the electric field, selecting a value for a variable F where $Q=2AP_sF$, Q being the electric charge passed through the sample by applying the electric field, A being the part of the area defined by the mask which is not covered by the mask, and $P_s$ being the spontaneous polarisation of the ferroelectric material, such that sufficient charge is passed to result in non-inverted regions of a desired size. Thus, the results of the poling method can be controlled by selection of the variable F, which adds flexibility to the method. F may have a value of between 1.3 and 10, or alternatively, of between 2 and 8, or alternatively, F may have a value greater than 2.

In a preferred embodiment, the mask is applied using exposure of a photoresist layer through an amplitude mask. This is a well-established photolithographic technique for applying masks for electric field poling, which in the present case offers a simple way of achieving domain periods greater than about one micrometre.

In an alternative embodiment, the mask is applied using interferometric exposure of a photoresist layer. Interferometric exposure by, for example, use of a phase mask or two beam interference, can be used to apply masks having periods of less than one micrometre. The use of overpoling according to the first aspect of the invention, in conjunction with a suitable mask, has been found to give good quality regular submicron poling, which has not been possible with prior art techniques. Therefore, in one embodiment, the periodic variation of nonlinearity value is induced with a period of less than approximately 1 μm.

Advantageously, the ferroelectric material is one of lithium niobate, lithium tantalate, $KTiOPO_4$, $KTiOAsO_4$, $RTiOAsO_4$, $RTiOPO_4$, $BaTiO_3$ or $KNbO_3$. Alternatively, any other ferroelectric material may be used instead.

The ferroelectric material may be provided with a dopant material which acts to enhance resistance of the ferroelectric material to photorefractive damage. Lithium niobate in particular is known to be susceptible to photorefractive damage, which tends to reduce the efficiency of optical interactions and in some instances can be permanent. Dopants such as MgO and ZnO can reduce the effect.

A second aspect of the present invention is directed to a sample of ferroelectric material having a periodic variation of nonlinearity value, the variation comprising a region or regions of inverted domains extending substantially through the sample and regions of non-inverted domains located in the vicinity of a surface of the sample.

The regions of non-inverted domains may extend to a depth below the surface of the sample of less than 50 μm, less than 12 μm, or alternatively to a depth below a surface of the sample of between 2 and 10 μm. In a preferred embodiment, the periodic variation of nonlinearity value has a period of less than 1 μm. The ferroelectric material may be one of lithium niobate, lithium tantalate, $KTiOPO_4$, $KTiOAsO_4$, $RTiOAsO_4$, $RTiOPO_4$, $BaTiO_3$ or $KNbO_3$, or any other ferroelectric material, and may be provided with a dopant material to enhance resistance of the ferroelectric material to photorefractive damage.

A third aspect of the present invention is directed to an optical waveguide fabricated from a sample of ferroelectric material as described in the preceding two paragraphs. The waveguide may be a planar waveguide or a channel waveguide.

A fourth aspect of the present invention is directed to an optical device comprising an optical waveguide as described in the preceding paragraph. The optical device may be configured for operation as one or more of: a forward three-wave mixing device; a backward three-wave mixing device; an optical parametric oscillator; a photon pair generator; a second harmonic generator; a power dependent switch; an electro-optic Bragg grating; or an acousto-optic Bragg grating.

A fifth aspect of the present invention is directed to an optical device comprising a 1-dimensional or a 2-dimensional photonic band gap structure fabricated from a sample of ferroelectric material as described above.

BRIEF DESCRIPTION OF THE DRAWINGS

For a better understanding of the invention and to show how the same may be carried into effect reference is now made by way of example to the accompanying drawings in which.

DETAILED DESCRIPTION

Electric Field Poling

Standard bulk electric field poling of ferroelectric materials is a well-established technique which is typically used to pole congruently-grown wafers of crystalline lithium niobate and other materials. In lithium niobate, the poling is carried out along the z-axis, which corresponds to the optic axis.

The basis of the standard technique is to apply an electrically-conducting mask defining the desired poling period to a surface of the sample. For lithium niobate, the mask is applied to one of the z-faces, to give the required poling along the optic axis. An electric field is applied across the sample to reverse the ferroelectric crystal domains, and hence the optical nonlinearity, only in the parts of the crystal under the areas covered by the mask, thus forming a poled grating structure extended through the full depth of the sample.

Figure 1A:
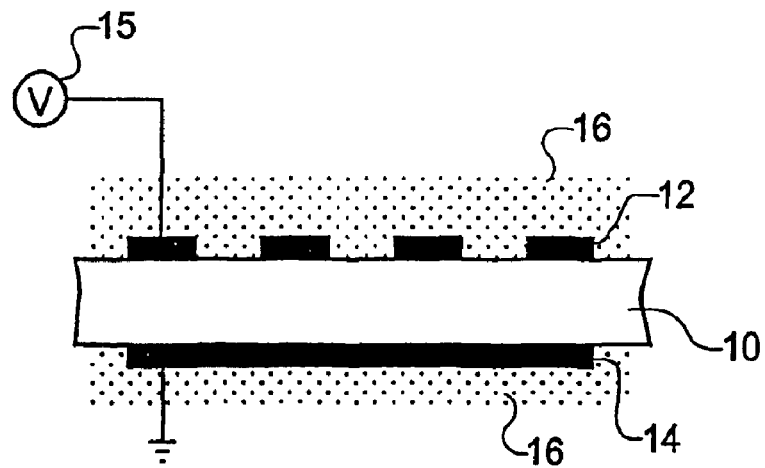
FIG. 1(a) shows a schematic representation of a bulk electric field poling method according to the prior art.

FIG. 1(a) shows a schematic cross-section of a sample of ferroelectric material prepared for poling in this way. The sample 10 has a pattern defined by a thin metal layer 12, such as 200 nm-thick aluminum, deposited on its +z surface. A continuous layer of metal 14 is applied to the -z surface. The two metal layers in effect form a pair of electrodes. Each surface is then surrounded with an insulating medium 16, which may be liquid or gas, or a vacuum. Alternatively, an insulating layer such as a layer of photoresist, can be deposited over the metal layer 12. The features of the mask are arranged to be parallel to either the x or y axis of the sample; conventionally the y axis is used.

After preparation, the sample is subjected to an applied electric field by connecting an external voltage source 15 across the electrode layers. This produces the desired poling. Reversal of the ferroelectric domains occurs when the applied field exceeds the so-called coercive field. This is a property of the material in question, and is about 220 kV $cm^{-1}$ for lithium niobate.

Figure 1B:
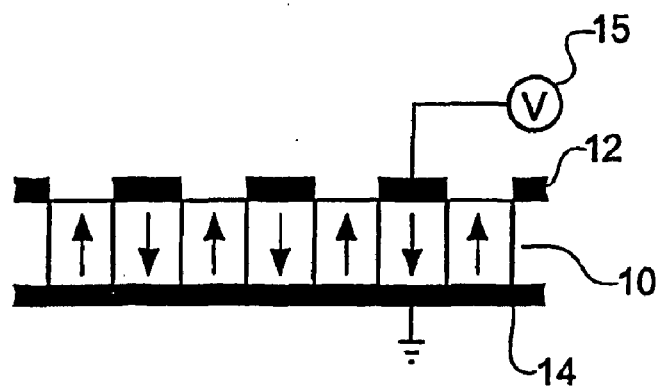
FIGS. 1(b) and 1(c) show schematic representations of the electric field poling process according to the method of FIG. 1(a)

FIG. 1(b) is a schematic diagram depicting the state of the sample 10 when poling is complete. The standard bulk poling method seeks to provide 180° domains that extend throughout the crystal depth. In FIG. 1(b), this is indicated by the arrows, with the downward pointing arrows corresponding to those parts of the sample underneath the metal mask and hence exposed to the electric field, and in which domain reversal has occurred. The upward pointing arrows correspond to those parts protected by the insulating medium, which remain non-inverted. The parts are well-defined, and the mark-to-space ratio of the inverted/non-inverted domains is constant throughout the sample depth.

To achieve poling of this quality, it is necessary to precisely calculate the required electric charge according to the conductive area defined by the metal mask, in order to be very accurate about the total volume of the ferroelectric domain inversion. The formula used for this calculation is defined as $Q=2AP_sF$, where: Q is the calculated charge; A is the area through which the electric field is applied directly to the sample (in other words, the area of the metal mask); $P_S$ is the spontaneous polarisation of the sample material (0.72 $\mu C/mm^2$ for lithium niobate); and F is an empirical factor to correct for variations of the total charge caused by crystal quality and thickness. Ideally, F has a value of 1.0, because no correction should be necessary. However, the factor effectively takes account of spreading of the poled volume and can vary appreciably when crystals from different suppliers are used. For accurate poling of the quality illustrated in FIG. 2(a), typical values for F span from 0.9 to 1.3.

If the required charge is incorrectly calculated, the poling will be of poor quality. For F values typically smaller than 0.9 the sample will be "underpoled", because the calculated charge corresponds to inversion of a smaller domain volume than the region defined by the mask. In this case domains are inverted preferentially in areas where domain nucleation is easier, e.g. at the edges of the mask pattern or regions of increased surface roughness. If F is too large, however, then the inverted domains spread more than required leading to "overpoling".

Figure 1C:
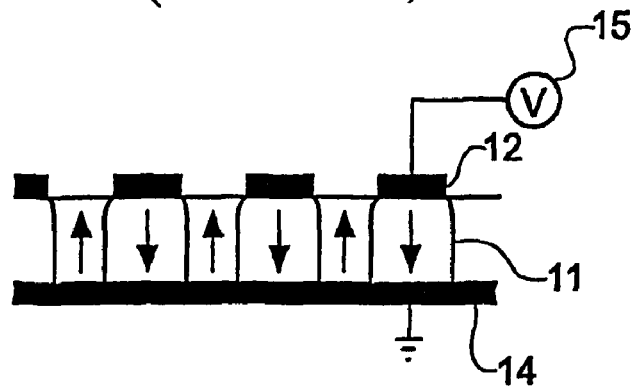

FIG. 1(c) shows a sample 11 which has been overpoled. The inverted volumes of the sample 11, below the metal 12, extend sideways and spread into the volumes which should be protected from inversion by the insulating medium 16. Thus the desired mark-to-space ratio of the poling is adversely affected. This is of particular significance for small grating periods, where the effects of any such error will be proportionately larger.

FIRST EMBODIMENT

The present invention is based on the surprising result that is it possible to achieve high quality periodic poling with constant poling period by exploiting the apparently undesirable overpoling effect. To date, it has conventionally been understood that if F is larger than about 2, the domain inversion readily spreads, causing merging between adjacent domain areas, so that the entire sample is inverted. The sample appears uniformly poled when observed between crossed polarisers.

However, careful investigation of samples poled according to embodiments of the present invention, which would traditionally be considered as overpoled and hence substantially useless, revealed that domains corresponding to the patterned features survive for regions located near to the sample surface and extending to depths of order of up to about 12 $\mu m$ microns below the surface. Typically, poling to depths of between 6 and 10 $\mu m$, or deeper, can be readily achieved, with shallower depths down to about 2 $\mu m$ also being possible. It is also expected that poling to greater depths of about up to about 50 $\mu m$ will be readily achievable;

this is of use for the poling of buried waveguide structures. This range of depths is more than adequate for the periodic poling of planar and channel waveguide structures, in which the poling is only required to extend sufficiently deeply to overlap with the guided optical fields.

Thus, methods according to embodiments of the invention are suitable for creating inverted domains in the vicinity of the surface of samples of ferroelectric material. Using these methods it is possible to fabricate very good quality periodically poled regions that extend in the propagation direction over centimetre dimensions, but only extend to the requisite ~10 $\mu$m depth of waveguide structures.

Figure 2:
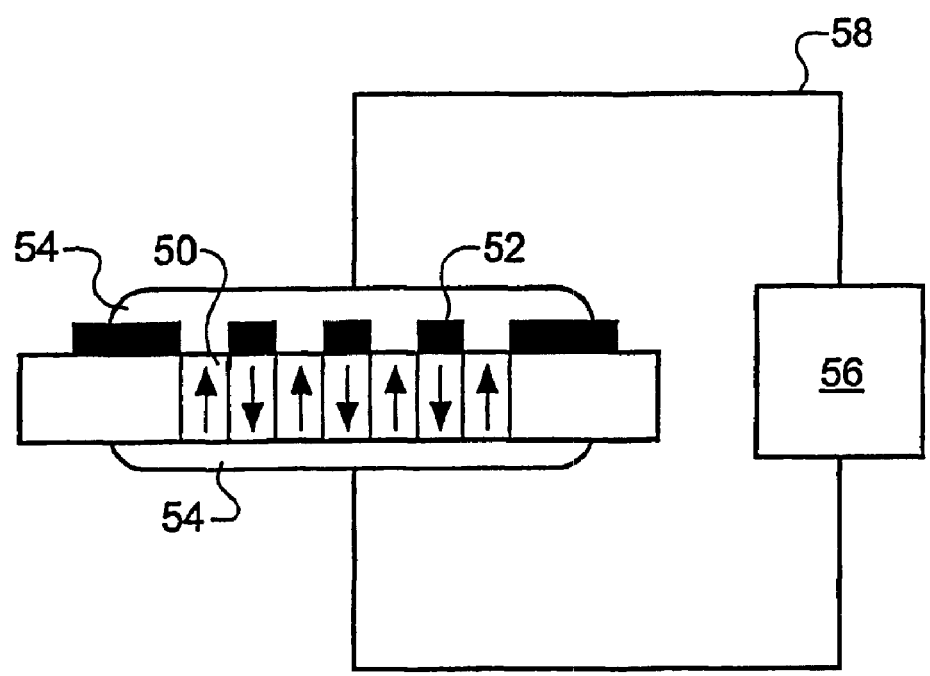
FIG. 2 shows a schematic representation of apparatus used to induce a periodic variation of nonlinearity in a sample of ferroelectric material in accordance with embodiments of the present invention.

FIG. 2 shows a schematic diagram of apparatus used for carrying out the poling method according to an embodiment of the present invention. A lithium niobate sample 50 was prepared from a 500 $\mu$m thick, 3.5 inch diameter z-cut wafer supplied by Crystal Technology Inc (USA). The −z face of the sample was covered with S1813 Shipley photoresist to a thickness of 1.2 $\mu$m using spin-coating. Photolithography was used to create an insulating mask corresponding to the desired periodic poling pattern, by exposing the photoresist to ultraviolet light through a periodic amplitude mask, and then developing it in the known manner. After development, the resulting relief pattern defined by the insulating mask allowed application of gel electrodes 54 to both the patterned area (−z face) and the +z face. The latter served as a uniform electrode for the application of the electric field. This was provided by a constant current high voltage source 56 connected via an external circuit 58 to the gel electrodes 54. Note that the poling pattern is defined by the mask of insulating photoresist; this is in contrast with the prior art method, in which a conductive mask is used. Use of a conductive mask does not permit surface domain structures to be engineered by overpoling. In further contrast with the prior art, the mask may be positioned on the −z face at any angle with respect to the x and y axes; alignment with either of these axes is not required. This simplifies the method of the present invention, and may allow poling of samples which would be rejected as unsuitable for poling with standard methods.

After being prepared in this way, the sample was poled using a constant current configuration where the applied electric field was varied to keep the current constant, while the charge that flowed through the sample 50 was calculated by a computer (not shown) that controls the overall poling process, including the variation of the field. The poling process was stopped when the desired total charge Q, which has been predetermined as one of the poling parameters in accordance with a particular value of F, had flowed through the sample 50. The total charge was that sufficient to achieve the desired poling effect, in which the inverted crystal domains extend throughout most of the sample, leaving small noninverted volumes in the surface region of the sample only, under each part of the surface protected by the insulating mask, and extending to a depth below the surface of between about 2 and 10 $\mu$m.

Figure 3A:
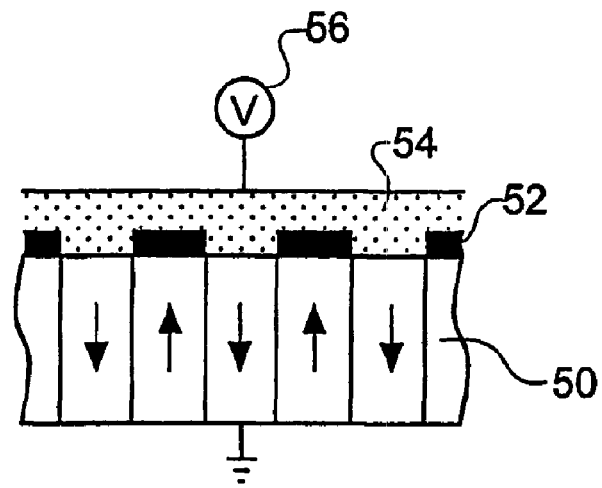
FIGS. 3(a), 3(b) and 3(c) show schematic representations of the electric field poling process according to embodiments of the present invention.
Figure 3B:
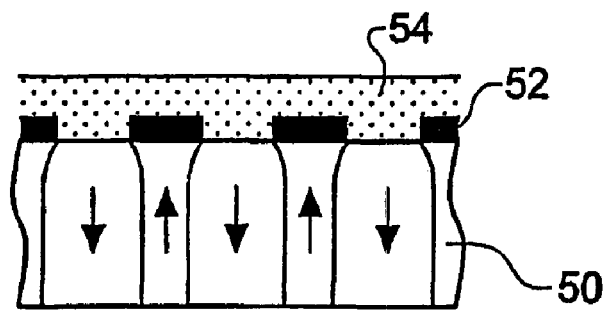
Figure 3C:
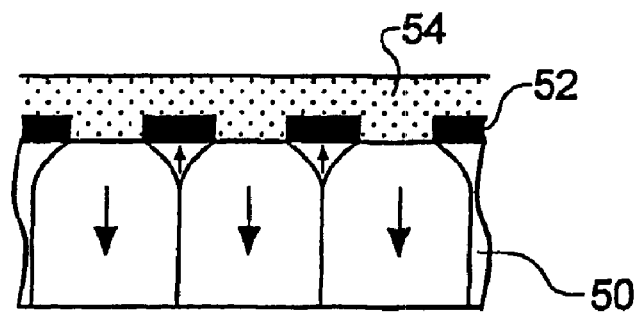

FIGS. 3(a), 3(b) and 3(c) show schematic depictions of various stages of this poling process in the sample 50. FIG. 3(a) shows the sample 50 at the point at which sufficient charge has been delivered to produce poling throughout the whole depth of the crystal, in much the same way as the desired end result of the prior art bulk poling process. In the present case, though, the inverted regions, shown by the downward pointing arrows, are those parts exposed to the gel electrode 54, while the photoresist mask 54 insulates the underlying crystal from the electric field so that inversion is prevented (upward pointing arrows).

FIG. 3(b) shows the sample 50 as overpoling commences, and the inverted regions begin to spread sideways and alter the mark-to-space ratio of the poling from that defined by the mask 52. Finally, FIG. 3(c) shows the sample 50 in its final poled state. The inverted regions, shown by the downward pointing arrows, extend through most of the sample. However, small non-inverted regions (upward pointing arrows) remain in the surface region of the sample 50 under those parts of the surface protected by the insulating mask 52. The mask is believed to provide sufficient protection from the electric field such that these regions remain non-inverted for very high levels of overpoling, with values of F as large as even 100 or more expected to provide usable surface periodic poling. Such large values are not necessary, however; any value of F greater than about 2 should provide sufficient overpoling, and in some instances, depending on the quality of the sample, a value as low as 1.3 may be adequate. More typically, though, values of F between about 1.3 and 10, or, more usefully, between 2 and 8, will give the desired results.

This use of overpoling, and the wide range of F values which can be tolerated to achieve it, means that the requirements to perform accurate calculations of Q, and to ensure that the necessary charge is delivered according to a particular varying electric field, are much less strict than those needed in the poling methods of the prior art. The charge can be delivered simply using one single pulse of applied voltage, so there is no requirement for the complex voltage/current variations used in the controlled spontaneous backswitching method.

Figure 4:
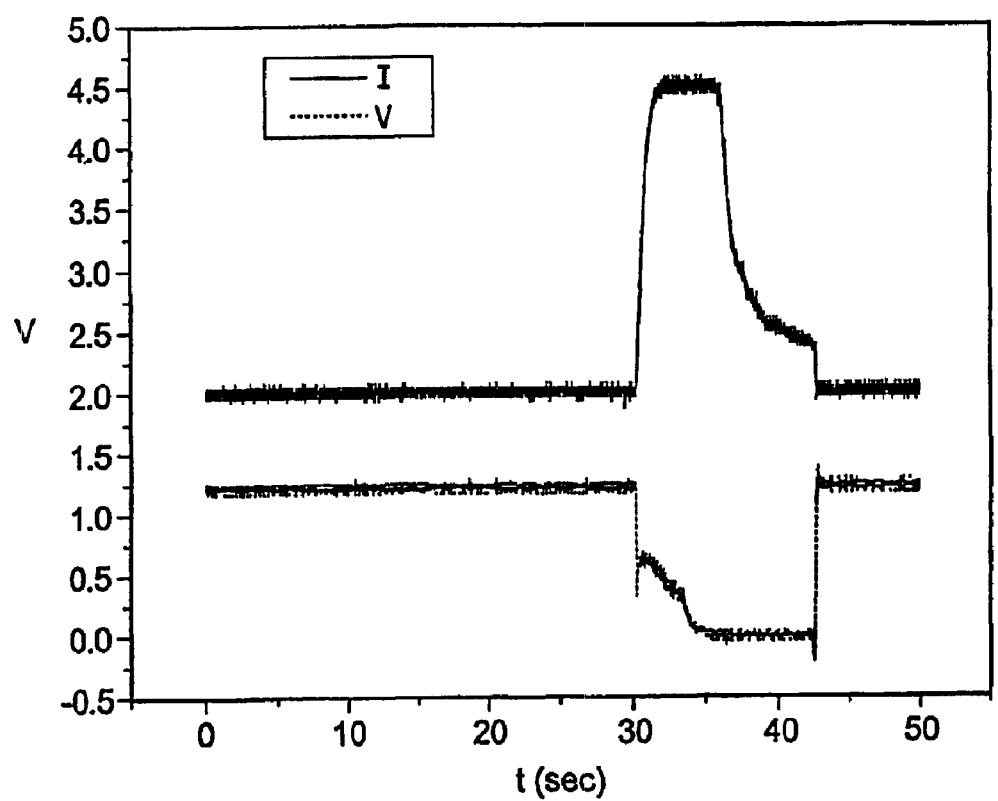
FIG. 4 shows curves of the variation of voltage and current applied to a sample using the apparatus of FIG. 3.

FIG. 4 shows a plot of a typical poling curve, that is, the variation of voltage (dotted curve) and current (solid curve) with time as measured on an oscilloscope. The single voltage pulse can be seen.

A range of periods have been successfully engineered using this method, in which photolithographic patterning via an amplitude mask is used to form the insulating mask. These include 2.5 $\mu$m, 3.5 $\mu$m, 4.0 $\mu$m and 6.4 $\mu$m. Longer periods of the order of 10 $\mu$m or 20 $\mu$m or above are also possible. However, it is not an easy task for conventional photolithography to reliably produce features extending far below 1 $\mu$m.

SECOND EMBODIMENT

To fabricate periods of the order of 1 $\mu$m and smaller, ultraviolet exposure of the applied photoresist layer can be performed interferometrically by using a phase mask instead of the amplitude mask discussed above. Alternatively, interferometric exposure can be achieved using two beam interferometry. Other steps in the poling method are performed as described hereinbefore.

Samples having 1 $\mu$m periodic intensity patterns and hence 0.5 $\mu$m domain widths have been fabricated in this way, but it is expected that domain patterning down to periods of the order of about 0.3 $\mu$m or possibly less should be readily achievable using exposure with near ultraviolet radiation.

The use of overpoling according to the present invention is particularly well-suited to the production of poled samples with sub-micron periods. Standard bulk electric field poling tends to produce poor quality poling at these dimensions, because any errors caused by even slight overpoling are significant so that it is difficult to achieve narrow inverted domains of a constant width throughout the depth of the sample. The present invention overcomes this; it has been found that at poling depths confined to surface regions by overpoling, the period of domain inversion is still well-defined by the period of the applied insulating mask. Also, by providing surface poling only, the effect of error is less important; there is no requirement to provide high accuracy over a large crystal volume.

RESULTS

A number of samples have been poled using these methods, with various values of F, and various lengths of poling period. The poled samples have been studied in detail by etching them with acid. Etching with hydrofluoric (HF) acid, either alone or in combination with nitric acid ($HNO_3$), is an established technique used to reveal the presence of 180° degree domains in periodically poled lithium niobate, but in the present case it revealed the unexpected result that overpoling leads to quality periodic poling surviving in surface regions of samples. Previously reported observations of overpoled samples have failed to reveal this feature. In the prior art, catastrophically overpoled samples where periodic poling through the sample has been destroyed have been dismissed as being unusable.

Therefore, after poling, the samples were etched using pure HF acid for durations between 30 min to 60 min in order to reveal the surface domain structures. For real applications of poled material, it is important to know the depth of these domains, and for this purpose, poled samples were cut and polished at an angle of 45° so that a cross-section through the domain would be exposed and subjected to etching in the HF acid. Investigation of the cross-sections with a scanning electron microscope revealed the depth of the domains to be typically of the order of 5 to 11 $\mu$M.

Figure 5:
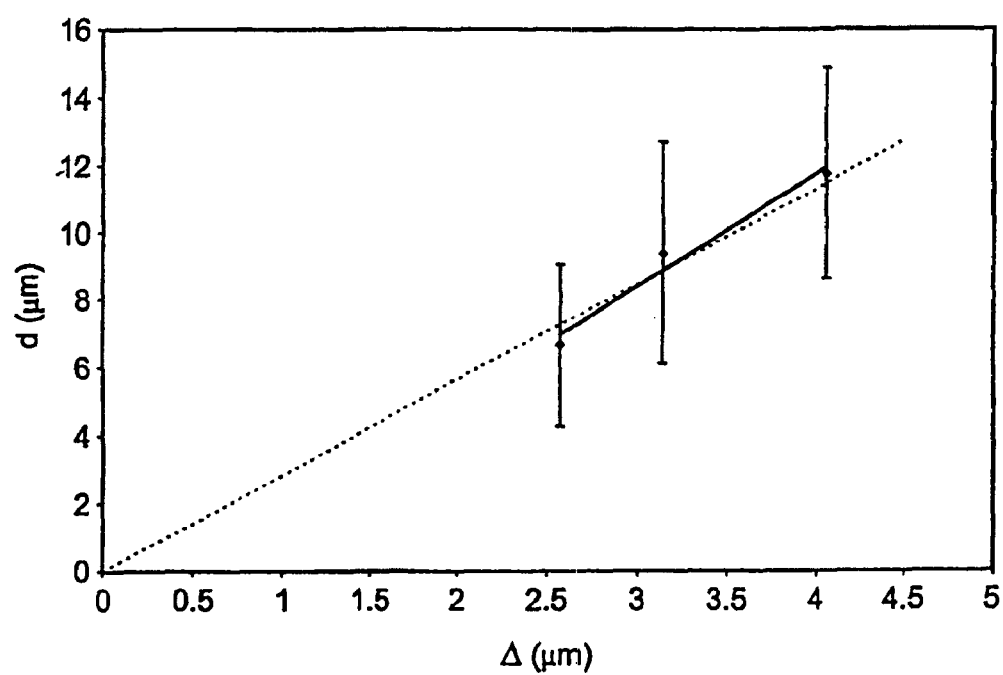
FIG. 5 shows a graph of the relationship between domain period and domain depth measured from samples of ferroelectric material poled in accordance with embodiments of the present invention.

FIG. 5 shows a plot of the variation of measured domain depth d with the period A of the imposed photolithographic pattern. Although the variation of measured domain depth (taken for between 30 and 100 periods) is rather large, two clear points emerge. Firstly, there is a minimum in the domain depth achieved. Secondly, the mean depth is seen to scale approximately linearly with period. For applications that require sub-micron periodicity, this is again a useful observation as overlap between the guided modes and domain inverted regions is a pre-requisite for efficient non-linear interactions. FIG. 5 shows two fits to the measured data points: one includes the origin (0,0) as an implicit data point. The close agreement between these two gradients further confirms the approximate linearity stated above.

Figure 6A:
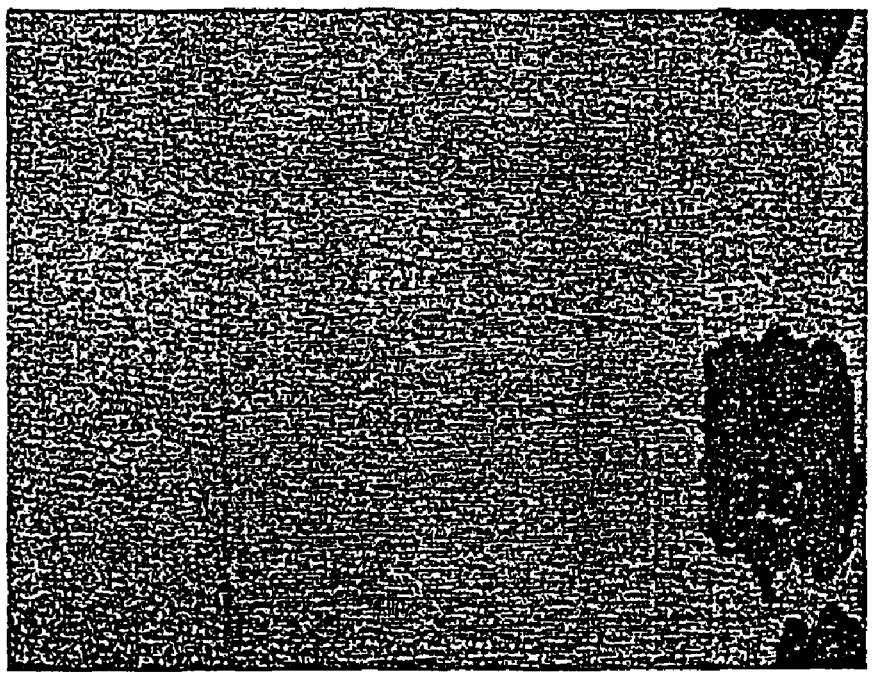
FIGS. 6(a) and 6(b) show optical microscope pictures of a sample of ferroelectric material poled in accordance with an embodiment of the present invention.
Figure 6B:
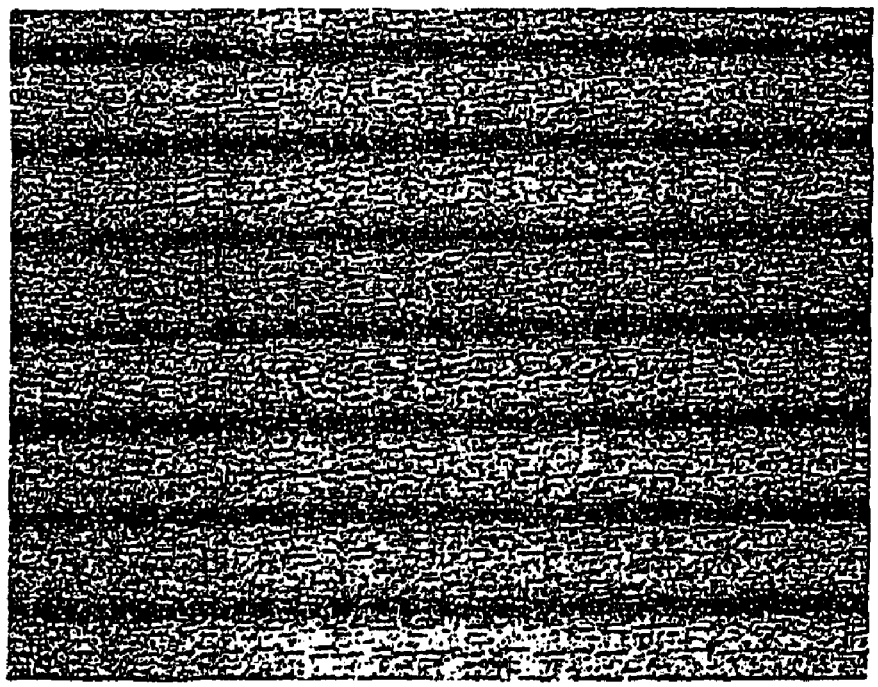

The samples were also studied using an optical microscope. FIGS. 6(a) and 6(b) show pictures of a single sample having a period of 6.4 $\mu$m produced with an F value of 6. The pictures were taken at different magnifications (×50 and ×1000 respectively), and show the uniformity of the poled structures at different scales. Surface damage which is observed in some cases always lies outside the patterned area near the edges of the photoresist, and is attributed to electron avalanche effects which are caused due to the high electric fields present at the photoresist edges. This is not detrimental to the optical performance of the poled material, because it is beyond the boundary of the poled volume.

Figure 7A:
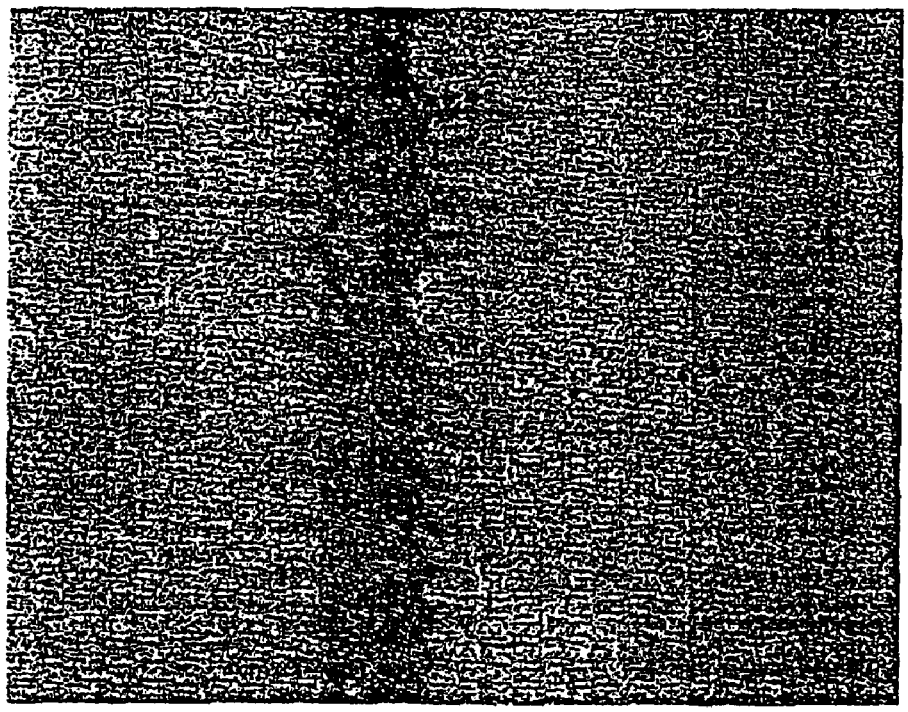
FIGS. 7(a) and 7(b) show optical microscope pictures of channel waveguides fabricated in samples of ferroelectric material poled in accordance with embodiments of the present invention.
Figure 7B:
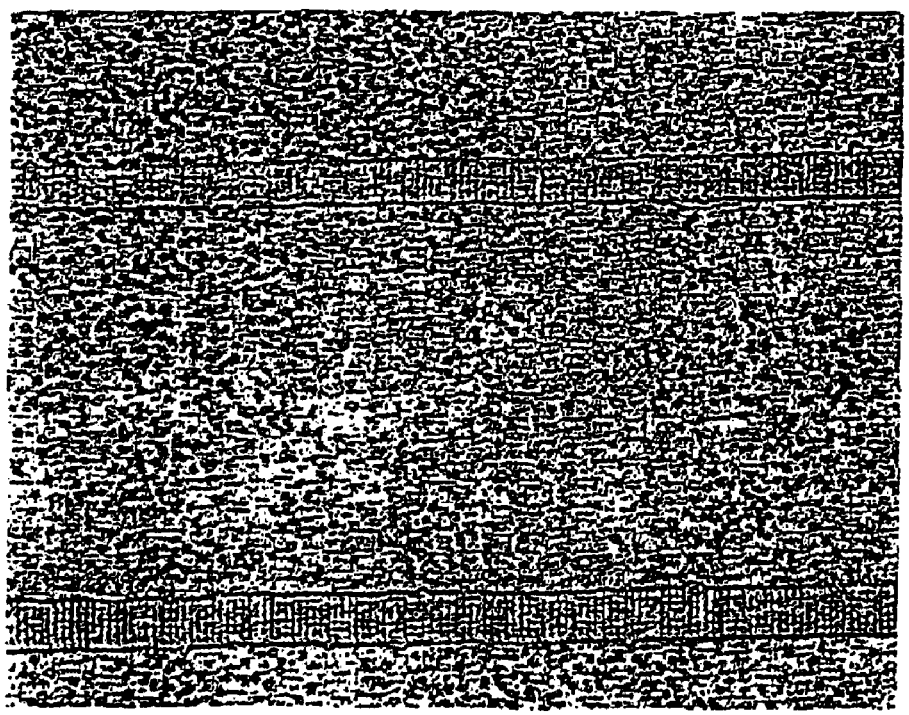

FIGS. 7(a) and 7(b) show further optical microscope images, this time of samples having periods of 3.5 $\mu$m, and produced with F values of 6. In this case, FIG. 7(a) shows a sample in which the periodic poling is formed in a channel waveguide structure formed in the sample of lithium niobate prior to poling, by the titanium indiffusion technique. FIG. 7(b) shows a similar poled waveguide structure, formed in this instance by proton exchange. The images show that the electric field poling method of the present invention may be used with great success in lithium niobate treated in either of these ways. Indeed, both of these waveguides have been successfully used in second harmonic generation experiments, in which 850 nm light from a Ti:sapphire laser was frequency-doubled to a wavelength of 425 nm.

Figure 8:
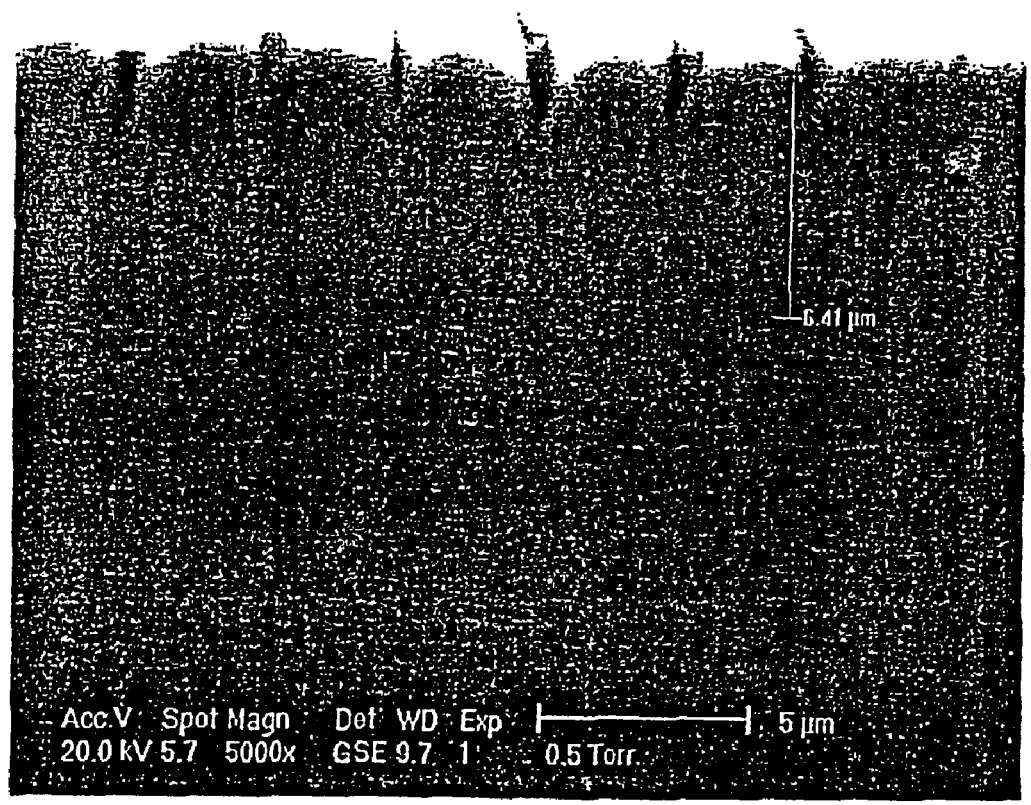
FIG. 8 shows a scanning electron microscope picture of a sample of ferroelectric material poled in accordance with an embodiment of the present invention.

FIG. 8 shows a scanning electron microscope picture of a sample obtained with an F value of 8. $HF/HNO_3$ acid etching has revealed that the poling is confined to the surface region, in this case to a depth of 6.4 $\mu$m. The period of the poling is 2.5 $\mu$m. From this result and other measurements it is evident that the domain depth is inversely related to the F value. In other words, as F is increased, the domain depth reduces. Also, the depth is affected by the period of the insulating mask. As mentioned, a wide range of F values is expected to give useful structures. It is expected that use of very high F values (perhaps about 100 or higher) will give very narrow and shallow domain regions, with dimensions in the nanometre region.

Figure 9:
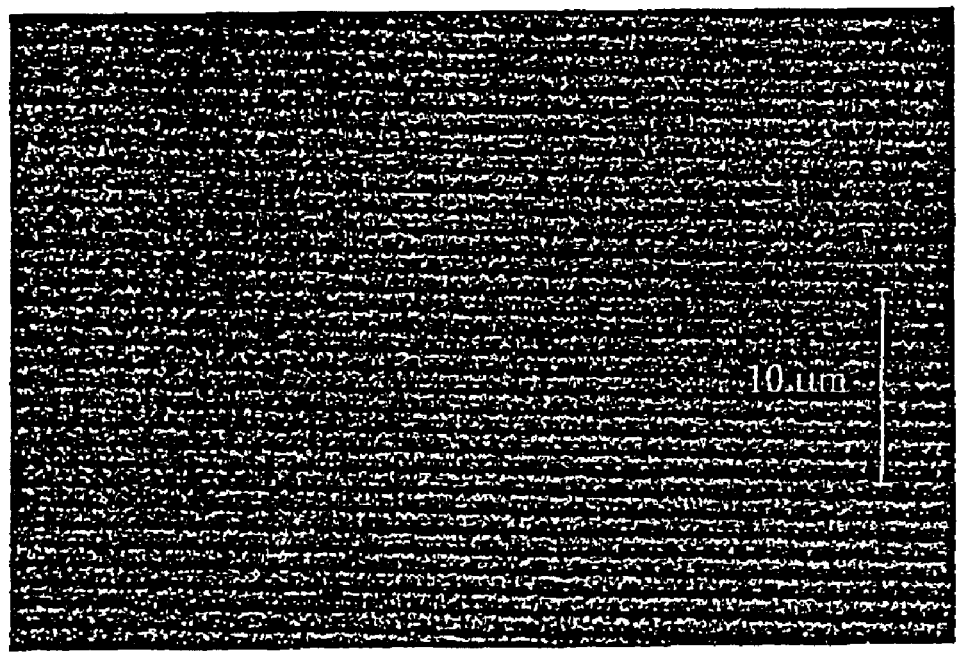
FIG. 9 shows a scanning electron microscope picture of a sample of ferroelectric material poled in accordance with an embodiment of the present invention and having a submicron domain period.

Turning to results obtained from samples poled using interferometric exposure of the photoresist via a phase mask, FIG. 9 shows a scanning electron microscope picture of a poled sample, etching of which revealed regular 1 $\mu$m domain patterns with domain widths of 0.5 $\mu$m. It is believed that this is the first ferroelectric sample having a near sub-micron domain period to be fabricated by any electric field poling technique.

APPLICATIONS

As indicated by the FIGS. 7(a) and 7(b) and the accompanying text, the methods of the present invention are well-suited for the fabrication of poled volumes in planar and channel waveguide structures. These can be used for a wide variety of nonlinear optical applications, as shown in FIGS. 10 to 15.

Figure 10:
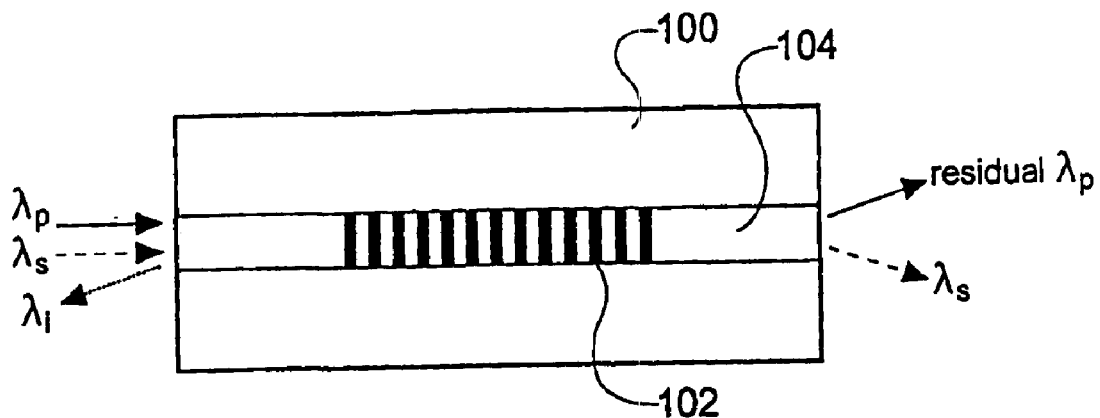
FIGS. 10 to 15 show schematic plan views of waveguide devices fabricated from samples of ferroelectric material poled in accordance with embodiments of the present invention.

FIG. 10 is a schematic plan view of a waveguide device 100 having a periodically poled grating structure 102 fabricated within a channel waveguide 104. A structure of this type is suitable for use as a frequency converter based on the backward-three-wave-mixing (BTWM) interaction. In use, an incoming pump beam with wavelength $\lambda_p$ interacts with the nonlinear waveguide material and with an incoming signal beam $\lambda_s$ to generate a backward travelling idler beam $\lambda_i$, which carries any modulation of the signal beam, but at a different wavelength such the frequencies of the beams are related by $\omega_i + \omega_s = \omega_p$. At the same time the signal beam is also amplified. The phase-matching condition required for this interaction is provided by the use of a periodic nonlinearity achieved in the channel waveguide by means of the above-described poling methods. An advantage of BTWM lies in the physical separation between the signal and the idler and pump. A wavelength converter based on such a device therefore does not require any optical filtering to separate the desired wavelength (idler) from the residual ones (pump and signal).

A device based on BTWM typically requires a periodicity of the non-linear grating of less than 1 $\mu$m, in order to compensate for the large momentum mismatch between the counter-propagating waves. Therefore, the above-described poling methods are ideally suited for the fabrication of such devices because of the ease and simplicity with which high quality sub-micron periods can be created by using a phase mask or two beam interferometry to expose the photoresist mask.

Figure 11:
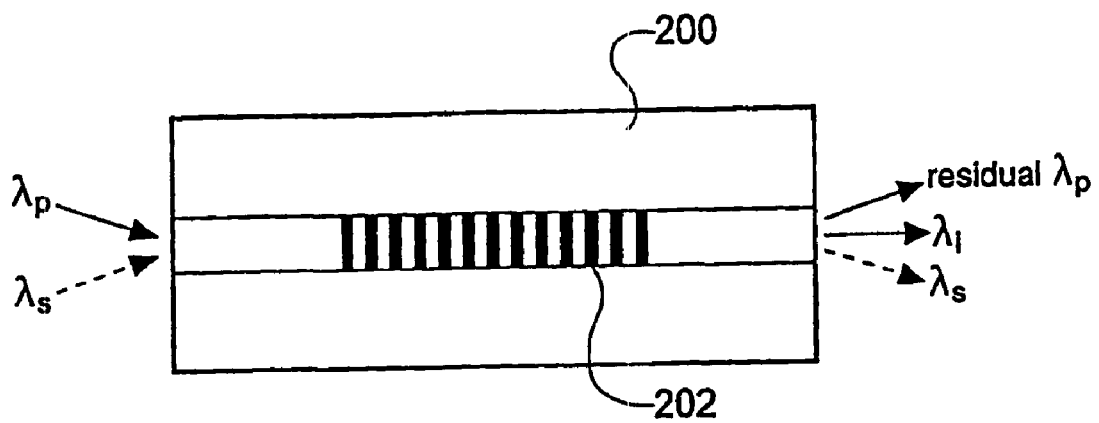

FIG. 11 shows a similar channel waveguide device 200 having a grating 202, configured for forward-three-wave-mixing. In this case, the pump beam $\lambda_p$ interacts with the nonlinear waveguide material and with the incoming signal beam $\lambda_s$ in a phase-matched manner to produce a forward travelling idler beam $\lambda_i$ such that, as before, $\omega_i+\omega_s=\omega_p$ and the idler beam carries any modulation of the signal beam, which is amplified. FTWM typically requires periods of tens of micrometres, so suitable waveguides can be fabricated via the methods of the present invention involving use of an amplitude mask to expose the photoresist. However, due to the copropagating nature of the waves involved, optical filtering may be necessary to separate idler from signal and to suppress the residual pump signal.

Figure 12:
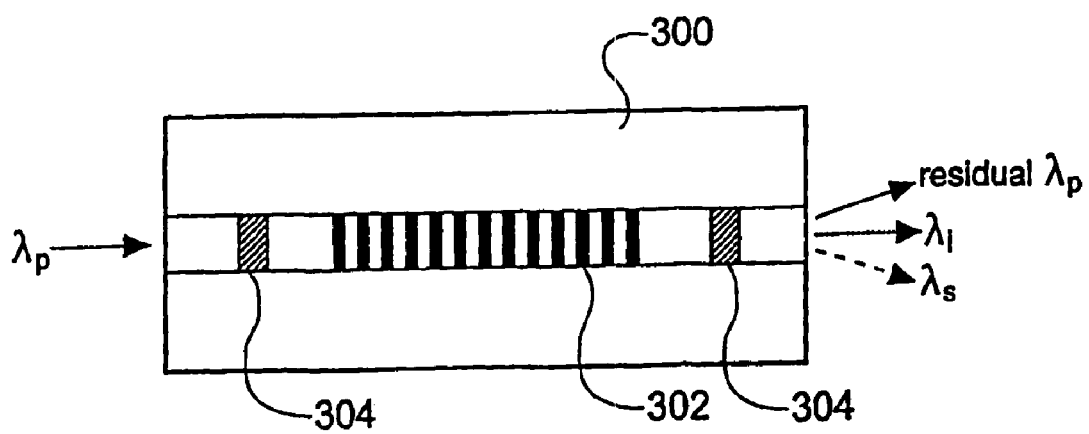

FIG. 12 show an optical parametric oscillator (OPO) fabricated in the form of a waveguide device 300 having a periodic grating 302 in a channel waveguide. The optical feedback required for oscillation is provided by reflectors 304 arranged at each end of the grating 302, such as Bragg gratings directly fabricated in the ferroelectric material. OPOs are widely used as sources of coherent radiation possessing a very broad tunability range, which find useful application for example in spectroscopy, material and laser science. An incoming pump beam $\lambda_p$ is converted via a phasematched nonlinear interaction in the grating into a signal beam $\lambda_s$ and an idler beam $\lambda_i$ such that $\omega_p=\omega_i+\omega_s$. The reflectors 304 provide feedback at either $\lambda_s$ or $\lambda_i$.

Figure 13:
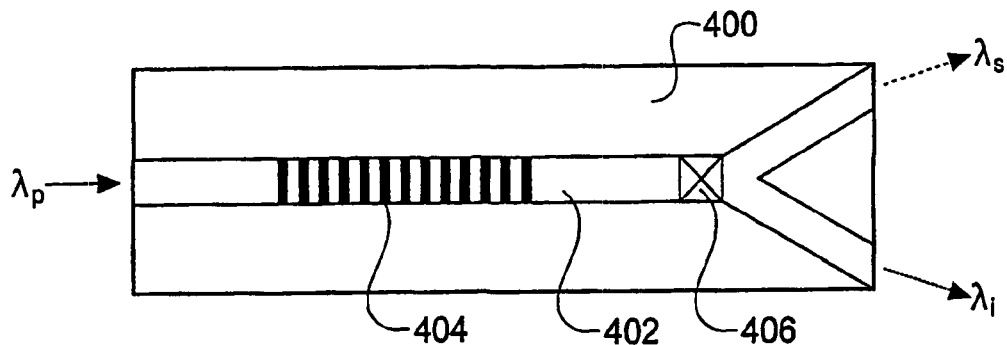

FIG. 13 shows a further waveguide device in the form of a photon-pair generator, which operates via a special case of TWM. The device 400 shown is based on a forward interaction, and comprises a Y-shaped channel waveguide 402 containing a grating 404 and a wavelength division multiplexer 406. The pump beam $\lambda_p$ enters the device, and interacting with the nonlinearity of the poled waveguide, provides amplification for photons originating from quantum noise. Each pump photon is then split into a signal photon with wavelength $\lambda_s$ and an idler photon with wavelength $\lambda_i$, which are separated by the multiplexer 406 and exit the device 400 along one or other arms of the Y of the channel waveguide 402. The two photons represent a pair and possess special correlation properties, which exhibit non-local behaviour. This can be exploited for example in a quantum key distribution system where the photon pair generator would represent the light source.

Figure 14:
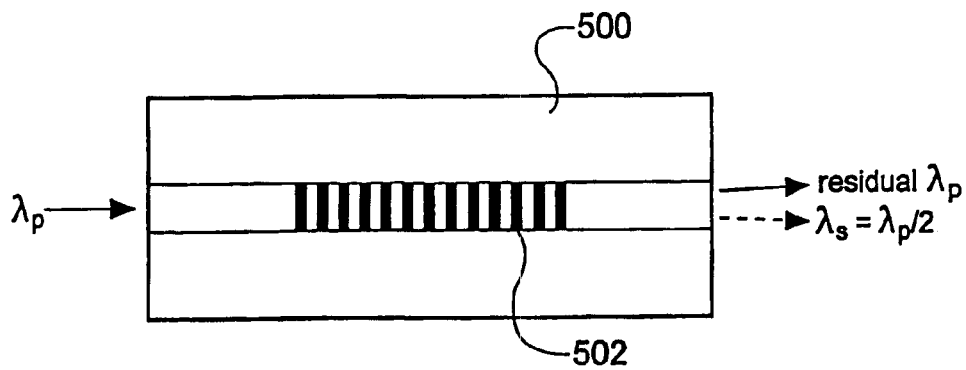

FIG. 14 shows another waveguide device 500 comprising a periodic grating 502 in a channel waveguide, and configured for operation as a second harmonic generator. This device is another case of TWM (here considered in the forward direction). The pump beam at wavelength $\lambda_p$ self-beats to produce a second harmonic signal beam at $\lambda_s=\lambda_p/2$. Second harmonic generation is useful for the generation of new wavelengths by frequency-doubling the output of readily available powerful lasers.

Figure 15:
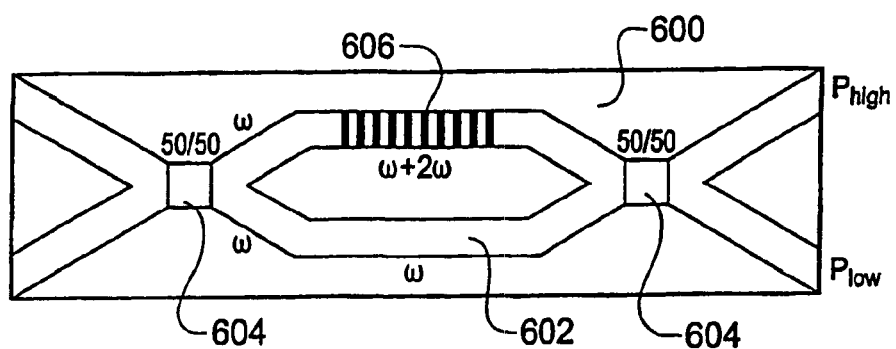

FIG. 15 shows a further waveguide device 600, which is a power-dependent optical switch. A channel waveguide 602 has two arms, joined at two places by 50:50 beam couplers 604 to form a Mach-Zehnder interferometer. One of the arms is provided with a poled grating structure 606. In this device, the nonlinearity provided by the periodic poling is cascaded, by which it is meant the incident pump beam at frequency $\omega$ is frequency-doubled to $2\omega$ and then converted back to $\omega$. In this process, the pump wave acquires a power-dependent phase shift which is used in combination with the operation of the interferometer to implement power-dependent switching. If the power is high the signal will exit port $P_{high}$, otherwise port $P_{low}$.

Applications of the surface poled materials are not limited to devices utilising the nonlinear interactions described above. Optical devices relying on any interaction which can be realised using a grating structure or structures can be fabricated. For example, bulk and waveguide devices incorporating electro-optic and acousto-optic Bragg gratings are possible.

Additionally, the accurate submicron poling periods which can be readily achieved by the methods according to embodiments of the present invention mean that the methods are well-suited to the fabrication of photonic bandgap (PBG) devices, operating in both one and two dimensions. PBG devices are artificially created structures that possess periodicity at the wavelength scale, and for which a modulation of dielectric constant (refractive index n) exists. The regular (usually linear in period) structure will reflect specific wavelengths $\lambda$ so that "bandgaps" appear (often called "stop bands") in the reflection or transmission spectra of the devices. PBG devices can be constructed in one, two or three dimensions, but always have a periodic modulation of refractive index at a scale of $\lambda/2n$. For example, in lithium niobate, for which n 2.3, a periodicity of ~325 nm is required for operation at a wavelength of 1.5 $\mu$m.

FURTHER EMBODIMENTS

Although the poling methods described thus far have been directed to arrangements in which the insulating mask is applied to the −z face of the ferroelectric sample, the invention is equally applicable when the mask is applied to the +z face of the sample. This arrangement is believed to give results comparable to those presented herein.

The insulating mask may be fabricated using any electrically insulating material from which a suitable pattern can be defined; the invention is not limited to the use of photoresist.

Further, although the results described herein have been obtained from samples of congruent lithium niobate, it is expected that the methods may also be successfully applied to stoichiometric lithium niobate.

Also, the invention is not limited to the poling of lithium niobate. Other ferroelectric materials, in particular lithium tantalate, $KTiOPO_4$ (KTP), $RTiOAsO_4$ (RTA), $KTiOAsO_4$ (KTA), $RTiOPO_4$ (RTP), $BaTiO_3$ and $KNbO_3$ can be engineered using the methods of the present invention. It is well known that these materials can be poled using conventional bulk electric field poling techniques. Additionally, the ferroelectric material may be a wafer or other sample having a single crystal structure, or it may be polycrystalline. This is an advantage over standard bulk poling techniques, in which the object of creating domain structures which extend right through the material limits the application of the techniques to single crystal samples.

The ferroelectric material may also be doped with a dopant material which has the effect of reducing the susceptibility of the ferroelectric to photorefractive damage. Lithium niobate in particular is prone to photorefractive damage, an undesirable effect caused by incident light which reduces the efficiency of optical interactions occuring in the ferroelectric. Various dopants can be added to the ferroelectric to improve its resistance to the damage. Many metal oxides are suitable dopant materials, including MgO and ZnO.

Various kinds of waveguide may be poled, including planar waveguides and channel waveguides. For example, the waveguide may be formed in bulk ferroelectric material, or it may be a surface waveguide in which the ferroelectric material is deposited as a layer on a substrate of the same or a different material, possibly in a ridge waveguide configuration. Alternatively, the waveguide may of the buried kind, with a layer of ferroelectric material located below the waveguide surface at an appropriate depth for the poling process to form the periodic domain structure within it.

CONCLUSION

Finally, in conclusion, a new method able to produce fine period "surface" domain structures on congruent lithium niobate and other ferroelectric materials has been described. The comparative advantages over conventional poling techniques include high reproducibility (low rejection rate) and uniform quality of the inverted domain structure. The depth extent of these domains are ideal for waveguide applications.

REFERENCES

[1] K. Kintaka, M. Fujimura, T. Suhara and H. Nishihara, *Electr. Lett.* 32, 2237 (1996)
[2] M. Yamada, N. Nada, S. Saitoh and K. Watanabe, *Appl. Phys. Lett.* 62, 435 (1993)
[3] R. G. Batchko, V. Y. Shur, M. M. Fejer and R. L. Byer, *Appl. Phys. Lett.* 75, 1673, (1999)
[4] V. Y. Shur, E. L. Rumyantsev, E. V. Nikolaeva, E. I. Shishkin, R. G. Batchko, G. D. Miller, M. M. Fejer and R. L. Byer, *Ferroelectrics* 236, 126, (2000)
[5] T. Sugita, K. Mizuuchi, Y. Kitaoka and K. Yamamoto, *Jap. J Appl. Phys.*, Part 1 40, 1751, (2001)
[6] Jonas Webjorn, Frederic Laurell and Gunnar Arvidsson, *J Light. Tech.* 7, 1597 (1989)

What is claimed is:

1. A method of inducing a periodic variation of nonlinearity value in a sample of ferroelectric material, comprising:
    applying an electrically insulating mask to a surface of the sample, the mask defining a desired area of nonlinearity variation;
    applying an electric field across the sample to produce domain inversion in the sample beneath the area defined by the mask; and
    removing the electric field when non-inverted regions of the sample remain only in the vicinity of the surface of the sample beneath parts of the surface covered by the mask.

2. A method of according to claim 1, in which the domain inversion results in a periodic inversion of the nonlinearity value.

3. A method according to claim 1, in which the non-inverted regions extend to a depth below the surface of the sample of less than 50 $\mu$m.

4. A method according to claim 1, in which the non-inverted regions extend to a depth below the surface of the sample of less than 12 $\mu$m.

5. A method according to claim 1, in which the non-inverted regions extend to a depth below the surface of the sample of between 2 and 10 $\mu$m.

6. A method according to claim 1, and further comprising, before the applying of the electric field, selecting a value for a variable F where $Q=2AP_sF$, Q being the electric charge passed through the sample by applying the electric field, A being the part of the area defined by the mask which is not covered by the mask, and $P_s$ being the spontaneous polarisation of the ferroelectric material, such that sufficient charge is passed to result in non-inverted regions of a desired size.

7. A method according to claim 6, in which F has a value of between 1.3 and 10.

8. A method according to claim 6, in which F has a value of between 2 and 8.

9. A method according to claim 6, in which F has a value greater than 2.

10. A method according to claim 1, in which the mask is applied using exposure of a photoresist layer through an amplitude mask.

11. A method according to claim 1, in which the mask is applied using interferometric exposure of a photoresist layer.

12. A method according to claim 1, in which the periodic variation of nonlinearity value is induced with a period of less than approximately 1 $\mu$m.

13. A method according to claim 1, in which the ferroelectric material is one of lithium niobate, lithium tantalate, $KTiOPO_4$, $KTiOAsO_4$, $RTiOAsO_4$, $RTiOPO_4$, $BaTiO_3$ or $KNbO_3$.

14. A method according to claim 1, in which the ferroelectric material is provided with a dopant material which acts to enhance resistance of the ferroelectric material to photorefractive damage.

15. A sample of ferroelectric material having a periodic variation of nonlinearity value, the variation comprising a region or regions of inverted domains extending substantially through the sample and regions of non-inverted domains located in the vicinity of a surface of the sample.

16. A sample of ferroelectric material according to claim 15, in which the regions of non-inverted domains extend to a depth below the surface of the sample of less than 50 $\mu$m.

17. A sample of ferroelectric material according to claim 15, in which the regions of non-inverted domains extend to a depth below the surface of the sample of less than 12 $\mu$m.

18. A sample of ferroelectric material according to claim 15, in which the regions of non-inverted domains extend to a depth below the surface of the sample of between 2 and 10 $\mu$m.

19. A sample of ferroelectric material according to claim 15, in which the ferroelectric material is one of lithium niobate, lithium tantalate, $KTiOPO_4$, $KTiOAsO_4$, $RTiOAsO_4$, $RTiOPO_4$, $BaTiO_3$ or $KNbO_3$.

20. A sample of ferroelectric material according to claim 15, in which the ferroelectric material is provided with a dopant material which acts to enhance resistance of the ferroelectric material to photorefractive damage.

21. A sample of ferroelectric material according to claim 15, in which the periodic variation of nonlinearity value has a period of less than 1 $\mu$m.

22. An optical device comprising a 1-dimensional or a 2-dimensional photonic band gap structure fabricated from a sample of ferroelectric material according to claim 21.

23. An optical waveguide fabricated from a sample of ferroelectric material according to claim 15.

24. An optical device comprising an optical waveguide according to claim 23.

25. An optical device according to claim 24, and configured for operation as one or more of: a forward three-wave mixing device; a backward three-wave mixing device; an optical parametric oscillator; a photon pair generator; a second harmonic generator; a power dependent switch; an electro-optic Bragg grating; or an acousto-optic Bragg grating.

* * * * *